(12) United States Patent
Grassier et al.

(10) Patent No.: US 11,236,717 B2
(45) Date of Patent: Feb. 1, 2022

(54) ASSEMBLY HAVING A HIGH-PRESSURE PUMP AND A CONTROL DEVICE ARRANGED UPSTREAM OF THE HIGH-PRESSURE PUMP

(71) Applicant: Woodward L'Orange GmbH, Stuttgart (DE)

(72) Inventors: Frank Grassier, Glatten-Boffingen (DE); Rainer Zass, Stuttgart (DE)

(73) Assignee: Woodward L'Orange GmbH, Stuttgart (DE)

( * ) Notice: Subject to any disclaimer, the term of this patent is extended or adjusted under 35 U.S.C. 154(b) by 0 days.

(21) Appl. No.: 16/966,712

(22) PCT Filed: Mar. 6, 2019

(86) PCT No.: PCT/EP2019/055605
§ 371 (c)(1),
(2) Date: Jul. 31, 2020

(87) PCT Pub. No.: WO2019/170770
PCT Pub. Date: Sep. 12, 2019

(65) Prior Publication Data
US 2021/0033055 A1    Feb. 4, 2021

(30) Foreign Application Priority Data
Mar. 8, 2018  (DE) ............... 10 2018 001 913.7

(51) Int. Cl.
*F02M 63/02*   (2006.01)
*F02D 41/22*   (2006.01)
(Continued)

(52) U.S. Cl.
CPC .... *F02M 63/0225* (2013.01); *F02M 63/0056* (2013.01); *F02D 41/221* (2013.01);
(Continued)

(58) Field of Classification Search
CPC .......... F02M 63/0225; F02M 63/0056; F02M 59/46; F02D 41/3836; F02D 2200/0602; F02D 2200/18; G05D 7/03
(Continued)

(56) References Cited

U.S. PATENT DOCUMENTS 5,996,556 A * 12/1999 Klinger ................. F02M 59/34
                                                           123/446
6,142,120 A * 11/2000 Biester ................ F02D 41/3082
                                                           123/446
(Continued)

FOREIGN PATENT DOCUMENTS

| DE | 19630938   | 2/1998 |
| DE | 19834120   | 2/2000 |
| EP | 1275842    | 1/2003 |
| WO | WO9513474  | 5/1995 |

OTHER PUBLICATIONS

PCT International Search Report and Written Opinion in International Appln. No. PCT/EP2019/055605, dated Jun. 18, 2019, 13 pages.

(Continued)

*Primary Examiner* — Mahmoud Gimie
(74) *Attorney, Agent, or Firm* — Fish & Richardson P.C.

(57) ABSTRACT

The subject matter of this specification can be embodied in, among other things, an apparatus that includes a high-pressure pump having a pump element, a regulating device positioned upstream of the high-pressure pump, a fuel channel defined between an inflow side of the regulating device and the pump element, and a safety device, actuatable to reduce a through-flowable cross section of the fuel channel.

16 Claims, 3 Drawing Sheets

(51) Int. Cl.
  *F02M 59/46*  (2006.01)
  *F02M 63/00*  (2006.01)
  F02D 41/38   (2006.01)
  G05D 7/03    (2006.01)

(52) U.S. Cl.
  CPC .. *F02D 41/3836* (2013.01); *F02D 2200/0602* (2013.01); *F02M 59/46* (2013.01); *F02M 2200/18* (2013.01); *G05D 7/03* (2013.01)

(58) Field of Classification Search
  USPC .......................................... 123/446, 457–459
  See application file for complete search history.

(56) References Cited

U.S. PATENT DOCUMENTS

| | | | | |
|---|---|---|---|---|
| 6,142,747 A | * | 11/2000 | Rosenau | F04B 23/103 |
| | | | | 417/251 |
| 7,025,044 B1 | * | 4/2006 | Breeden | F02M 59/08 |
| | | | | 123/446 |
| 2001/0054411 A1 | * | 12/2001 | Yildirim | F02M 59/105 |
| | | | | 123/446 |
| 2003/0077184 A1 | * | 4/2003 | Ishimoto | F02M 59/46 |
| | | | | 417/295 |

OTHER PUBLICATIONS

PCT International Preliminary Report on Patentability in International Appln. No. PCT/EP2019/055605, dated Sep. 17, 2020, 7 pages.

\* cited by examiner

ASSEMBLY HAVING A HIGH-PRESSURE PUMP AND A CONTROL DEVICE ARRANGED UPSTREAM OF THE HIGH-PRESSURE PUMP

CROSS-REFERENCE TO RELATED APPLICATION(S)

This application is a U.S. National Phase Application under 35 U.S.C. § 371 and claims the benefit of priority to International Application Serial No. PCT/EP2019/055605, filed Mar. 6, 2019, which claims priority to German Application Serial No. 102018001913.7, filed Mar. 8, 2018, the contents of which are hereby incorporated by reference.

TECHNICAL FIELD

The present disclosure relates to an arrangement having a high-pressure pump and having a regulating device positioned upstream thereof, as per the preamble of claim 1. The arrangement is provided in particular for a common-rail fuel injection system.

BACKGROUND

In the prior art, with common-rail fuel injection systems of internal combustion engines, use is made of high-pressure pumps which are provided for charging the fuel that is to be dispensed by the fuel injectors, for example diesel fuel or heavy fuel oil, with pressure levels of up to over 2500 bar. Here, for the control of the delivery rate, use is made of a regulating device which is positioned upstream of the high-pressure pump and which is formed for example as a suction-throttle-type regulating device. If the regulating device fails, in particular with the result that the high-pressure pump then provides too high a delivery rate, this possibly leads to the safety valve on the engine activating and thus being intensely worn.

SUMMARY

Taking this as a starting point, the object on which the present disclosure is based is that of providing an arrangement of the above-stated type which overcomes the disadvantages of the prior art.

Said object is achieved by means of an arrangement having the features of claim 1.

Advantageous refinements and embodiments are specified in the further claims.

In an example aspect, an apparatus includes a high-pressure pump having a pump element, a regulating device positioned upstream of the high-pressure pump, a fuel channel defined between an inflow side of the regulating device and the pump element, and a safety device, actuatable to reduce a through-flowable cross section of the fuel channel.

Various embodiments can include some, all, or none of the following features. The safety device can be configured to be actuated to set (1) a defined through-flowable cross section at the fuel channel, (2) a defined residual delivery rate of the high-pressure pump, or (3) both. The safety device can be configured to, upon an actuation, displace an engagement element, whereby an action on a shut-off member for reducing a present through-flowable cross section of the fuel channel occurs. The safety device can be configured not to influence a through-flowable cross section of the fuel channel in the absence of an actuation. The safety device can be configured to be actuated to reduce a present through-flowable cross section of the fuel channel by action on a shut-off member. The shut-off member can be actuatable to be displaced relative to the fuel channel. The safety device can be configured for an auxiliary media actuation, and the shut-off member can be configured to actuate based on the auxiliary media actuation. The shut-off member can be a piston of the safety device or a control piston of the regulating device. The safety device can be an independent safety device, configured to actuate independently of at least one of the regulating device and the high-pressure pump. The apparatus can also include a throttle assembly configured to be displaceable into the fuel channel upon actuation of the safety device, and the throttle assembly can be further configured to maintain a through-flowable cross section in the fuel channel when displaced into the fuel channel. The safety device can be configured to not shut off, partially shut off, or completely shut off the fuel channel, based on an actuation characteristic. A displacement of a shut-off member can be controllable to set a predetermined residual delivery rate of the high-pressure pump. The safety device can be formed on a control block of the regulating device of the high-pressure pump, or the safety device can be formed on the high-pressure pump. The regulating device can be a suction-throttle-type regulating device, a pressure regulating valve device, or both. The apparatus can also include an actuating device configured to actuate the safety device in an event of failure of the regulating device.

In another example aspect, a fuel injection system includes a high-pressure pump having a pump element, a regulating device positioned upstream of the high-pressure pump, a fuel channel defined between an inflow side of the regulating device and the pump element, and a safety device, actuatable to reduce a through-flowable cross section of the fuel channel.

In another example aspect, an internal combustion engine includes a high-pressure pump having a pump element, a regulating device positioned upstream of the high-pressure pump, a fuel channel defined between an inflow side of the regulating device and the pump element, and a safety device, actuatable to reduce a through-flowable cross section of the fuel channel.

According to an example embodiment, an arrangement is proposed which has a high-pressure pump and a regulating device positioned upstream thereof, which arrangement is provided for an internal combustion engine, in particular for a common-rail fuel injection system of an internal combustion engine. An internal combustion engine which has the arrangement may preferably be designed as an auto-ignition engine (or as an auto-ignition engine also with applied-ignition capability), preferably for example as a diesel engine, in particular as a large engine, furthermore for example as a dual-fuel engine, for example for use with diesel fuel (and/or heavy fuel oil) and combustion gas.

For example, the internal combustion engine may be provided for a motor vehicle such as for example a ship, a rail vehicle such as a locomotive, a utility or special-purpose vehicle, or for example for a static facility, for example for a combined heat and power plant, an (emergency) electricity generator, and furthermore also for industrial applications, for example offshore or onshore.

The high-pressure pump of the arrangement is generally preferably one which is commonly used with common-rail fuel injection systems, specifically for providing highly pressurized fuel, in particular liquid fuel, for example to at least one rail or a manifold pressure accumulator of a common-rail fuel injection system. The high-pressure pump may be designed for example as a reciprocating-piston pump or as a radial piston pump, wherein the high-pressure pump is preferably configured to charge fuel which is conveyed to it, for example conveyed to it by a predelivery pump (of a fuel injection system formed with the high-pressure pump), with high pressure levels up to over 2500 bar or even 3000 bar.

The regulating device positioned upstream of the high-pressure pump serves in particular for setting a delivery rate or fuel delivery rate to the high-pressure pump, preferably in the course of a (regulated; continuous) flow through the regulating device (assuming pump operation, or operation of a fuel injection system formed with the pump). Along a fuel delivery path to the high-pressure pump or to a delivery inlet (in particular low-pressure inlet) thereof, the regulating device positioned upstream of the high-pressure pump is preferably arranged before the high-pressure pump or delivery inlet, and thus in particular also positioned upstream of the high-pressure pump in terms of flow (as viewed in a fuel delivery direction). Preferably, the regulating device is positioned directly upstream of the high-pressure pump or of a low-pressure inlet, and furthermore, the high-pressure pump may form for example a high-pressure pump module together with the regulating device positioned upstream. Preferably, the regulating device is designed as a suction-throttle-type regulating device, in particular by means of a preferably (regulating-)magnet-actuated control piston and a control block.

In the context of the proposed arrangement, this furthermore has a fuel channel, in particular a low-pressure fuel channel (and thus in particular a feed channel), which is formed so as to lead through the regulating device, preferably a control block thereof, between an inflow side, in particular a low-pressure inlet, of the regulating device and a pump element of the high-pressure pump (the fuel channel thus leads in particular from the inflow side (low-pressure inlet) of the regulating device to the pump element of the high-pressure pump).

Here, between the inflow side of the regulating device and the pump element of the high-pressure pump, the regulating device acts on the fuel channel (preferably so as to regulate the delivery rate) in the course of suction-throttle-type regulation, in particular by position variation, in particular displacement, of the control piston (which, here, in a manner dependent on position, can influence a through-flowable cross section in the fuel channel). The fuel channel, which runs or is led from the inflow side of the regulating device to the pump element of the high-pressure pump, may generally be formed by means of at least one drilled channel, in particular of relatively short dimensions, for example in the range of a few centimeters.

In some embodiments, the arrangement furthermore also has—in addition to the regulating device—an (additional) safety device which makes it possible or is designed (or has the functionality), by way of an actuation (actuation of the safety device), to reduce a presently, in particular a presently excessively large, through-flowable cross section, in particular resulting from a fault state of the regulating device, of the fuel channel, specifically in particular a through-flowable cross section between the inflow side (in particular low-pressure inlet) of the regulating device and the pump element of the high-pressure pump (in this respect, the fuel channel is in particular a low-pressure channel).

By means of the configuration of the arrangement, which now has the proposed safety device, it is made possible to throttle, or for example even entirely shut off, the fuel feed to the high-pressure pump even in the event of failure of the regulating device, in particular establish an emergency stop functionality in a fuel injection system. In a fault or failure situation of the regulating device, in the case of which an excessively high fuel delivery rate would be provided to the high-pressure pump, it is thus possible for the delivery rate to be forcibly reduced by means of the safety device, and thus for a safety valve at the engine to be conserved. With the safety device, which may in this case act in particular at the low-pressure side and therefore does not need to work against (system) high pressure, and which can thus be of inexpensive design, it is consequently possible for the wear of the safety valve to be reduced, and for a relatively long service life thereof to be made possible.

Particularly preferably, the safety device is provided to, by way of the actuation thereof, set a defined through-flowable cross section at the fuel channel or a defined residual delivery rate of the high-pressure pump.

Furthermore, embodiments of the arrangement are generally preferred in which the safety device is configured to, by way of an actuation, reduce a presently (excessively large) through-flowable cross section of the fuel feed line by action on a shut-off member. A shut-off member of said type is preferably a displaceable element such as a rod, a piston or a cylinder. Aside from these, other shut-off members, for example rotatable shut-off members, are however also conceivable.

Preferred embodiments of the arrangement are for example directed to the safety device being configured to (in particular upon actuation of the safety device) displace or linearly move the shut-off member, in particular relative to the fuel channel. For example, owing to the action on the shut-off member, in this case preferably in the form of a piston or a rod, a displacement thereof may occur such that, here, the shut-off member is displaced with at least one portion into the fuel channel (for example protrudes in; for example by way of an end portion) so as to reduce the through-flowable cross section thereof, or for example such that, as a result of the displacement, a first portion of relatively large cross section of the shut-off member is positioned in the fuel channel, specifically reduces the through-flowable cross section of said fuel channel, instead of a second portion of relatively small cross section (cross section which is relatively small in relation to the relatively large cross section) of the shut-off member (for example in the course of the displaceable element protruding through the fuel channel).

In general, and preferably, the safety device may be configured for actuation by means of a control medium, for example for pneumatic or hydraulic actuation, in the course of which an action on the shut-off member for the purposes of reducing the throughflow cross section is made possible, in particular said shut-off member is displaceable in the case of a shut-off member in the form of a displaceable element. In general, an action on the shut-off member may be provided indirectly, for example by means of an engagement element or coupling element of the safety device, which element is controllable or displaceable in particular by means of a control medium upon actuation, or directly, for example by direct actuation of the shut-off member, for example in the course of direct application of a control medium. For the displacement of a shut-off member in the form of a displaceable element, the safety device may for example have a control chamber which can be charged with an actuating or control medium. A control portion of the displaceable element or of an engagement or coupling element may in this case be arranged for example in the control chamber.

If the normally electrically actuated regulating device fails, in particular for example owing to an electrical failure in, for example, a common-rail fuel injection system which has the arrangement, it is possible with such a safety device actuated by (external) media to avoid said safety device from consequently also failing. It is however also conceivable for the safety device to be able to be electrically actuated (for example by means of a dedicated electrical supply). In general, in this context, it is provided that the safety device is an independent or autonomous safety device, in particular is actuatable independently of the regulating device and/or of the high-pressure pump and in particular is capable of working autonomously in relation to said devices.

Preferred embodiments of the arrangement, in the case of which the shut-off member is in particular a displaceable element such as a piston, a cylinder or a similar element, may provide that the displaceable element is for example a piston of the safety device, and thus an element of the safety device. In yet further preferred embodiments, the shut-off member or the displaceable element may for example be a control piston of the regulating device, and thus an element of the regulating device. Specifically in the case of such embodiments, the displaceable element may be displaceable for example both by means of the actuating mechanism of the regulating device (for example by means of an actuating magnet) and by means of an actuating mechanism, in particular an engagement or coupling element as discussed above, of the safety device (for example via a coupling rod).

In particular for example in the case of embodiments of the arrangement in which the shut-off member protrudes with a portion into the fuel channel (actuation of the safety device) for the purposes of intentionally reducing the through-flowable cross section, but furthermore also generally, the shut-off member, and thus the safety device, may have a throttle arrangement which, upon actuation of the safety device, is displaceable into the fuel channel. Here, the throttle arrangement that has been displaced into the fuel channel may maintain a through-flowable cross section in the fuel feed line. It is thus possible to set a residual or minimum delivery rate of the downstream high-pressure pump by means of the throttle arrangement, formed for example by means of at least one throttle bore, with which residual or minimum delivery rate it is for example possible to realize emergency operation of the internal combustion engine after triggering of the emergency stop functionality or actuation of the safety device.

Also preferred, for example, are embodiments of the arrangement in which the safety device is configured to not shut off, partially shut off (in particular with a defined through-flowable cross section) or completely shut off the fuel channel in a manner dependent on an actuation characteristic. Such embodiments may for example provide a stepped actuation, for example with stepped actuating pressure levels (in particular in the case of media actuation). For example, in accordance with a first actuating pressure level, a throttle arrangement of the shut-off member may be introduced into the fuel channel, and generally for example a first, relatively large through-flowable cross section of the fuel channel (reduced in relation to the presently excessively large through-flowable cross section) may be set, and with a second, for example higher actuating pressure level, a second, relatively small through-flowable cross section, for example even a completely shut-off cross section, may for example be set in the fuel channel. In the absence of an actuating pressure level, a presently prevailing through-flowable cross section of the fuel channel is in this case for example not influenced by the safety device.

The safety device is generally preferably configured to, in the absence of an actuation, not influence the position of the shut-off member, and hold this, or an engagement or coupling element provided for the actuation thereof, preferably in a rest position. In such a rest position, a presently prevailing through-flowable cross section, set by means of the regulating device, of the fuel feed line is then not influenced. Furthermore, the safety device is preferably configured to automatically set the shut-off member, or an engagement or coupling element provided for acting on or controlling the same, into such a rest position after the withdrawal of an actuation. For the self-resetting—and furthermore for example for the provision of different actuation stages, in particular as discussed above—the shut-off member or the engagement or coupling element may for example be spring-loaded. Media-actuated resetting is however also conceivable.

The safety device may for example be formed (with the exception of the control lines, for example), in an advantageously uncomplicated and structurally small manner, on a control block, which forms the regulating device, of the high-pressure pump or for example also directly on/in the high-pressure pump. The safety device may for example provide a dedicated housing, arranged for example on a control block or on the high-pressure pump. For the displaceable mounting in particular of a separately provided shut-off member in the form of a displaceable element, it is possible here for a correspondence channel to be provided, formed for example by means of a drilled channel, in which the displaceable element is received and guided, wherein the correspondence channel transitions, at an end portion, for example into a control chamber, specifically preferably for the purposes of receiving/guiding a control portion of the displaceable element. The arrangement of a spring load for self-resetting of the displaceable element may for example also be provided in the control chamber.

Advantageously simple embodiments of the arrangement, which in particular utilize the existing control piston of the regulating device also for the implementation of the safety device, are furthermore directed to arranging the engagement or coupling element in a—prefabricated—housing assembly, which is for example mountable on the control block, which is designed with corresponding receiving capability. Such an assembly may for example also provide a control connection for the actuation of the safety device formed therewith.

In particular in order to actuate the safety device in an intended manner in particular in a fault situation of the regulating device, the arrangement may furthermore comprise an actuating device. The actuating device may for example have a failure sensor arrangement—for detecting failure of the regulating device—for example an electronic sensor arrangement such as for example a rail pressure sensor, and/or a control device connected thereto, in particular a control module, which initiates the actuation, specifically as soon as a failure is detected by means of the failure sensor arrangement. A failure is detected for example on the basis of an impermissible rail pressure increase owing to a presently excessively large through-flowable cross section at the fuel channel, associated with an excessively high delivery flow rate of the high-pressure pump.

For example, the control device may, for the actuation, initiate charging of the safety device, in particular of a control chamber thereof as discussed above, for example, with hydraulic or pneumatic pressure. In association with this, an action is then exerted on the shut-off member so as to reduce the through-flowable cross section of the fuel channel. Analogously, the actuating device may for example also initiate the withdrawal of the media pressurization, specifically as soon as restored functionality of the regulating device is detected for example by means of the failure sensor arrangement.

Finally also proposed is a fuel injection system having an arrangement as discussed above, and an internal combustion engine which has at least one arrangement as discussed above or a fuel injection system of said type.

Further features and advantages will emerge from the following description of exemplary embodiments on the basis of the figures of the drawings, which show details essential to example embodiments, and from the claims. The individual features may be realized in each case individually or severally in different combinations in a variant of the embodiments.

Preferred embodiments will be discussed in more detail below on the basis of the appended drawings, in which.

BRIEF DESCRIPTION OF THE DRAWINGS

DETAILED DESCRIPTION

In the following description and in the drawings, identical reference designations correspond to elements of identical or similar function.

Figure 1:
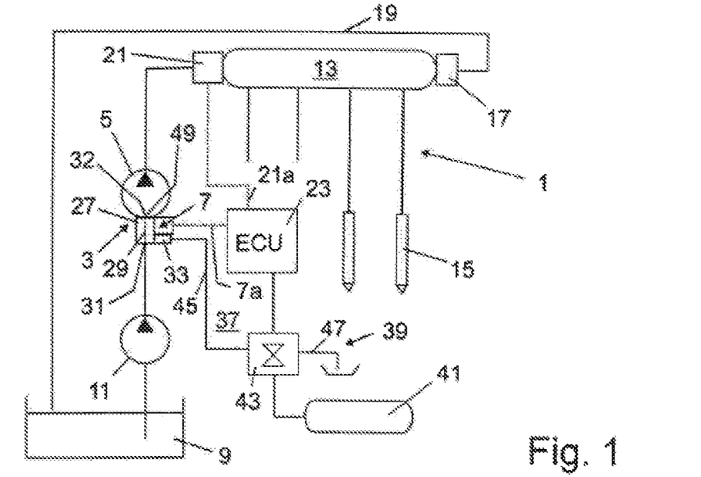
FIG. 1 shows, by way of example and schematically, a structural circuit diagram of a fuel injection device of an internal combustion engine with an arrangement according to a possible embodiment.

FIG. 1 shows, by way of example, a fuel injection system 1 of an internal combustion engine, which fuel injection system has an arrangement 3 having a high-pressure pump 5 and having a regulating device 7 positioned upstream thereof.

The fuel injection system 1 is designed as a common-rail fuel injection system and comprises a (liquid fuel) fuel tank 9 from which fuel, for example diesel fuel, bio-oil or heavy fuel oil can be delivered by means of a predelivery pump 11 or low-pressure pump to the inflow side of the high-pressure pump 5 of the fuel injection system 1. Downstream of the outflow side of the high-pressure pump 5, the fuel injection system 1 has a manifold pressure accumulator or a rail 13, which is fed by the high-pressure pump 5 and from which fuel injectors 15 of the fuel injection system 1 can then be supplied with highly pressurized fuel. The fuel injection system 1 may for example also be configured for discharging excess fuel from the rail 13, for example by means of a pressure regulating valve 17 and/or a discharge line 19 (leakage).

The fuel injection system 1 furthermore has a pressure sensor 21 on the rail 13, which pressure sensor is connected (electrical line 21a shown by dashed lines) to a control unit 23 of the fuel injection system 1, designed in particular as a control module. The control unit 23—preferably in operative connection with the pressure sensor 21—furthermore actuates (line 7a) the regulating device 7 positioned upstream of the high-pressure pump 5, which regulating device is formed in the present case for example as a suction-throttle-type regulating device, in particular with a control piston 25, and in this case furthermore has a control block 27. A control block 27 is illustrated in more detail for example in FIGS. 2 to 7, in particular in FIGS. 6 and 7. By means of the regulating device 7, actuated by means of the control unit 23, the fuel delivery rate delivered by means of the high-pressure pump 5 to the rail 13 is regulated.

The arrangement 3 used with the fuel injection system 1 furthermore has a fuel channel 29 which is formed so as to lead through the regulating device 7, in particular the control block 27, between an inflow side of the regulating device 7, in particular a low-pressure inlet 31 (on the control block 27), and a pump element (not illustrated) of the high-pressure pump 5 (this will be discussed in more detail in the context of the further figures).

In addition to the regulating device 7, the arrangement 3 also comprises—in an inventive manner—a safety device 33 which makes it possible or is provided, by way of an actuation, to reduce a—presently excessively large—through-flowable cross section of said fuel channel 31, preferably in this case to set a predefined (reduced) through-flowable cross section.

To actuate the safety device 33, the fuel injection system 1 has an actuating device 37 which is formed in the present case for example by means of the rail pressure sensor 21, the control unit 23 and a device for media pressurization 39. Here, the device for media pressurization 39 comprises a pressurized media source 41, for example a pressure line or a pressure tank, furthermore for example a valve 43 which is controllable by means of the control unit 23, and a line 45, which, for selective pressure medium charging, specifically for actuation of the safety device 33, is led by the valve 43 to the safety device 33. In a further control position of the valve 43, the safety device 33 may for example be relieved of pressure by discharging of the pressure medium to a leakage outlet 47. By means of the device for media pressurization 39, it is for example possible for a hydraulic or pneumatic medium, specifically generally a control medium, to be supplied to the safety device 33.

Figure 2:
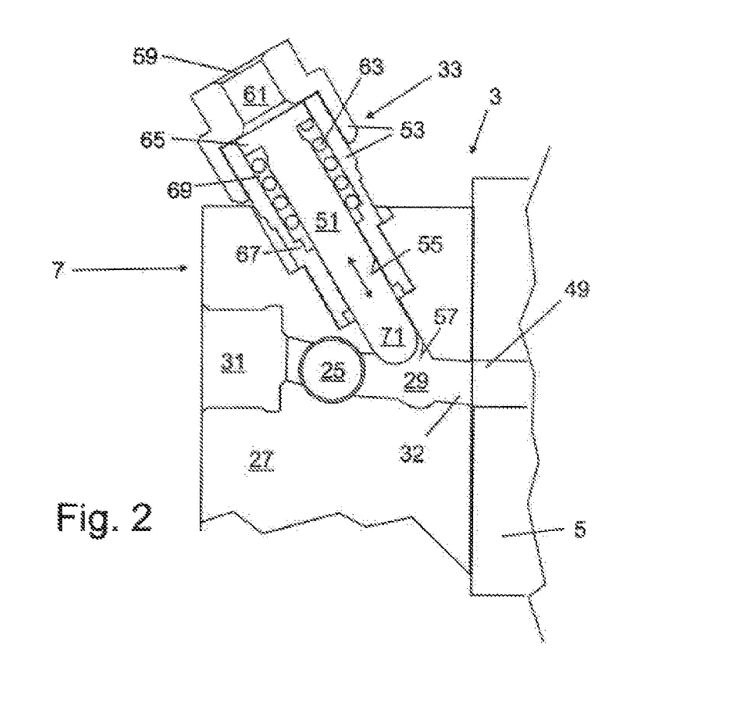
FIG. 2 shows, by way of example and schematically, a view of an arrangement according to a further possible embodiment, with the safety device illustrated in a non-actuated state.

FIG. 2 now shows a view of an arrangement 3, which view is focused on a control block 27 of the regulating device 7 positioned upstream of the high-pressure pump 5 and on the safety device 33.

As is now shown in more detail in FIG. 2, the fuel channel 29 of the arrangement 3, which fuel channel leads through the regulating device 7 between the inflow side of the regulating device 7 and the inflow side of the high-pressure pump 5, leads generally from a low-pressure inlet 31 of the regulating device 7, formed in particular in the control block 27 (and thus from the inflow side of the regulating device 7), to a low-pressure outlet 32, to which the high-pressure pump 5 is connected by way of its low-pressure inlet 49, of the regulating device 7, in particular on the control block 27 (and thus to the inflow side of the high-pressure pump 5).

The fuel channel 29 is formed as a passage, for example by means of a number of drilled channels, in the control block 27, through which fuel channel 29—in the embodiment illustrated in FIG. 2—the control piston 25 of the regulating device 7 furthermore protrudes. In a manner dependent on the control position of the control piston 25, the delivery rate of the high-pressure pump 5 is influenced by means of cross section variation of a through-flowable cross section in the fuel channel 29, and thus the intended delivery rate of the high-pressure pump 5—in the normal operating situation—is set. For this purpose, with control of the control piston 25, in the course of which the control piston 25 is moved in the present case linearly (into or out of the drawing plane), different effective cross sections of the control piston 25 (see for example also FIGS. 6 and 7) cam be moved into the fuel channel 29.

The safety device 33 illustrated in FIG. 2 is now configured, or now makes it possible, by way of an actuation, to reduce a—presently excessively large—through-flowable cross section of the fuel channel 29 by action on a shut-off member 51. Here, the shut-off member 51 is a piston element, in particular a displaceable (piston) element, which is received and displaceably guided in a housing 53 (of the safety device 33), specifically in a (correspondence) receptacle 55. Here, the housing 53 is screwed in the control block 27 of the regulating device 7 (here, the safety device 33 thus formed may be provided, as it were, as a (screw-type) cartridge or in cartridge-like form).

At a fuel-channel-side end of the shut-off member 51 or piston at which the latter emerges from the housing 53, a (drilled) channel 57 is led in the control block 27 to the fuel channel 29 (so as to intersect the latter), such that the piston 51 can, when displaced in the direction of the fuel channel 29, protrude—via the drilled channel 57—into the fuel channel 29 and reduce a through-flowable cross section thereof in an intended manner (closing of the cross section). With reduction of the through-flowable cross section, it is possible to set a minimum or residual delivery rate of the high-pressure pump 5, in particular with the aim, in the event of failure of the regulating device 7, for example in the event of jamming of the control piston 25 (in particular with a presently excessively large through-flowable cross section), of making it possible to implement suitable emergency operation and conserve a safety valve on the engine. Furthermore, it is however also possible to act toward a complete closure of the fuel channel 29 by means of actuation of the safety device 33, cf. FIG. 3.

A displacement of the displaceable element or of the shut-off member 51 (piston) is in this case effected upon actuation of the safety device 33, for which purpose the housing 53 or the safety device 33 has a media connector 59 which is formed at a control end—forming a control chamber 61—of the housing 53 or a control end of the shut-off member 51, and via which the shut-off member 51 is, upon corresponding media pressurization, displaceable in the direction of the fuel channel 29. The media connector 59 is provided for selective connection/selective pressurization to/by a pressure media source 41, as has been discussed by way of example on the basis of FIG. 1.

Furthermore, in the housing 53, which is formed in two parts by means of an upper and a lower part, there is received a (pressure) spring 63 which forces the shut-off member 51—in the absence of an actuated state—into the illustrated rest position, in which the shut-off member 51 does not influence the opening width, through which flow can pass, of the fuel channel 29. Here, the spring element 63 is retained between a control-end-side collar 65 of the shut-off member 51 and a fuel-channel-side base 67 of the spring space 69 formed in the housing 53.

Figure 3:
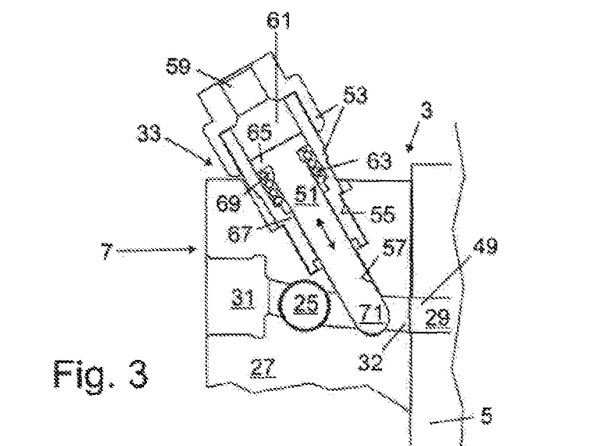
FIG. 3 shows, by way of example and schematically, a view analogous to FIG. 2, illustrating the safety device in an actuated state.

FIG. 3 now shows the safety device 33 as per FIG. 2 in an actuated position in which, owing to the pressure media charging via the media connector 59, the shut-off member 51 in the form of the displaceable piston protrudes with an end portion 71 through the fuel channel 29, and has thus intentionally reduced a through-flowable cross section thereof, or the through-flowable cross section that can be reduced by means of the shut-off member 51, and in this case has in particular also completely shut off the fuel channel 29.

It is evident with this solution, in the case of which the safety device 33 is mounted or arranged—with the exception of its control line connection—on the control block 27, that the outlay in terms of construction is low, and furthermore that a possibility of retrofitting same on regulating devices 7 according to the prior art is created.

Figure 4:
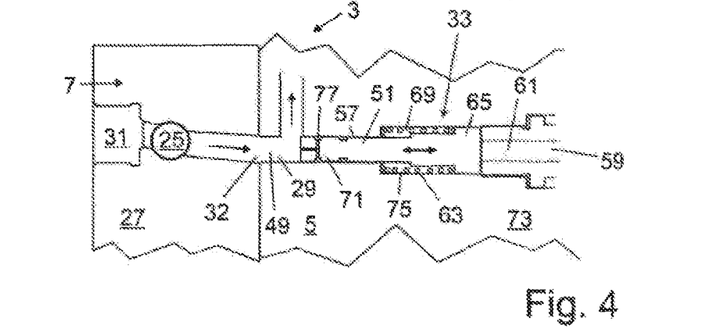
FIG. 4 shows, by way of example and schematically, a view of an arrangement according to another possible embodiment, illustrating the safety device in a non-actuated state.
Figure 5:
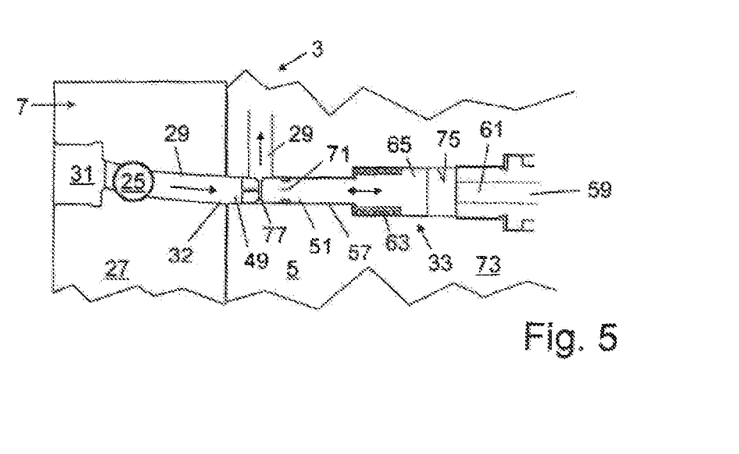
FIG. 5 shows, by way of example and schematically, a view analogous to FIG. 4, illustrating the safety device in an actuated state.

FIGS. 4 and 5 now show a further embodiment of an arrangement 3, wherein, by contrast to the embodiment discussed above on the basis of FIGS. 2 and 3, the safety device 33 is arranged or fixed in the housing 73 of the high-pressure pump 5. For this purpose, the high-pressure pump housing 73 forms a (correspondence) installation space 75 (which, analogously to the safety device 33 as per FIGS. 2 and 3, thus forms a housing 53 of the safety device 33). Both the shut-off member 51 of the safety device 33 and the pressure spring 63 are arranged or received in the installation space 75, and furthermore, at a (fuel-channel-averted) end of the installation space 75, there are in turn formed a pressure media connector 59, specifically by means of a connector piece, and a control chamber 61.

As a yet further difference in relation to the embodiment of the arrangement as per FIGS. 2 and 3, it is the case in the embodiment as per FIGS. 4 and 5 that the safety device 33 is designed to be able to, upon actuation of the safety device 33, displace the shut-off member 51, provided in turn in the form of a displaceable piston element, into a portion of the fuel channel 29 which is formed between a low-pressure inlet 49 of the high-pressure pump 5 and a (downstream) pump element (not illustrated) of the high-pressure pump 5, specifically in the pump housing 73. In the case of the solution presented, the piston element 51 is capable of protruding into the fuel channel 29 for example in the region of the apex of an L-shaped channel course.

Here, and likewise as a difference in relation to the embodiment as per FIGS. 2 and 3, the solution of the arrangement 3 shown in FIGS. 4 and 5 has a throttle arrangement 77 at that end portion 73 of the shut-off member 51 which is provided for introduction into the fuel channel 29, such that, upon displacement of the throttle arrangement 77 into the fuel channel 29, a residual delivery rate can be set by means of the throttle arrangement 77. The throttle arrangement 77 is for example formed by means of one or multiple throttle bores (in the present case of for example T-shaped form).

Here, FIG. 4 shows the safety device 33 not actuated in a rest position, in which the shut-off element 51 has not been displaced into the fuel channel 29, specifically in this case does not reduce or influence a through-flowable cross section of the fuel channel 29. Here, the pressure spring 63 received in the installation space 75 serves for maintaining the rest position.

By contrast, FIG. 5 shows the safety device 33 actuated, wherein a pressure medium at the media inlet 59 acts on the control end of the shut-off member 51, and this has consequently been displaced with the throttle arrangement 77 into the fuel channel 29. The intentional reduction of the—presently excessively large—through-flowable cross section of the fuel channel 29 is hereby effected. With this solution, it is advantageously possible for installation space in the existing pump housing 73 to be utilized for accommodating the safety device 33, with the throttle arrangement 77 which, displaced into the fuel channel 29, maintains a through-flowable cross section therein, furthermore advantageously an intentional residual delivery rate are defined or set.

Although not illustrated, it is also conceivable with such a solution for the safety device 33 to be designed such that the shut-off member 51 is displaceable beyond the throttle arrangement 77 into the fuel channel 29, such that said fuel channel can also be completely shut off by means of the shut-off member 51. For this purpose, it would for example be possible to consider pressure control which provides stepped media pressure levels, for example in conjunction with a lengthened movement travel of the shut-off member 51 (longer installation space 75).

On the basis of FIGS. 6 and 7, which are focused on the regulating device 7 of the high-pressure pump 5 together with the safety device 33 (the high-pressure pump 5 itself is not illustrated), a further preferred embodiment of the arrangement 3 will now be discussed, in the case of which, in particular, the control piston 25 acts as shut-off member 51 of the safety device 33. Here, the view as per FIG. 6 has been rotated through 90° to give the view in FIG. 7.

At an upper portion, the regulating device 7 has a regulating magnet part 79 which is electrically actuatable, specifically for (stroke) control of the control piston 25, by a control unit (ECU, control module, cf. for example FIG. 1) 23 via a control connector 81 of the regulating device 7. In the middle, partially sectioned region of the views, the control block 27 is illustrated, specifically together with the fuel channel 29, which leads through the control block 27 from the low-pressure inlet 31 of the control block 27 to the low-pressure outlet 32 of the control block 27 (and onward to the pump element of the downstream high-pressure pump 5). Also illustrated is the control piston 25, which, for the purposes of setting the delivery rate, is displaceable, specifically linearly or axially, with different effective cross sections (for example conically shaped, relatively large and relatively small cross sections) relative to the fuel channel 29 or in the latter.

Figures 6, 7:
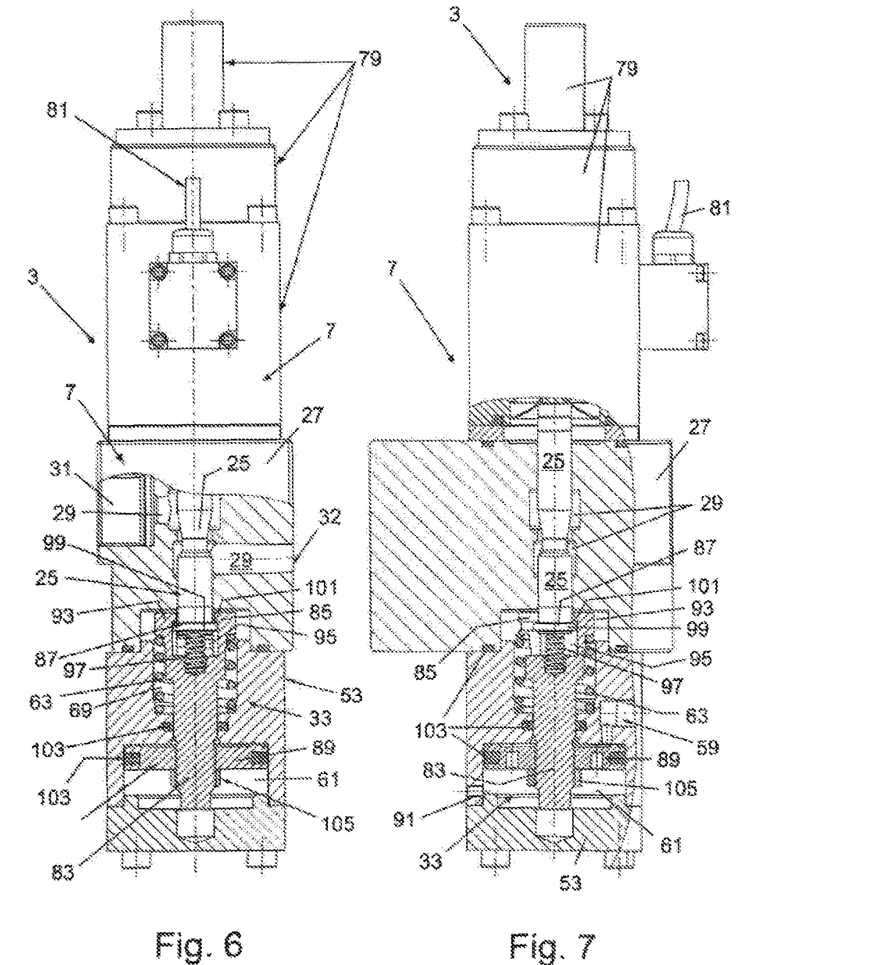
FIG. 6 shows, by way of example and schematically, a view of an arrangement according to a yet further possible embodiment, illustrating the safety device in a non-actuated state.
FIG. 7 shows, by way of example and schematically, a further view of the arrangement as per FIG. 6, illustrating the safety device in a non-actuated state.

To a lower end of the control block 27 in FIGS. 6 and 7, there is then fixed the safety device 33, which in this case has a dedicated housing 53. Received in the housing 53 is an engagement element 83 of the safety device 33, which engagement element is of bolt-like form and is retained with an engagement end 85 (engagement element engagement end) on a (correspondence) engagement end 87 of the control piston 25 (control piston engagement end), and is furthermore oriented coaxially with the control piston 25. Here, at one side, the engagement element engagement end 85 projects out of the housing 53 of the safety device 33, specifically as a free end, and at the other side, the control piston engagement end 87 projects out of the control block 27, that is to say likewise as a free end.

Furthermore, in the housing 53, opposite the engagement element engagement end 85 as viewed in the displacement direction of the control piston 25 and thus also of the engagement element 83, there is formed a control chamber 61 which (as before in the other embodiments) is provided for pressure media charging, but now in order to be able to displace the engagement element 83 upon actuation of the safety device 33. For this purpose, a pressure medium connector 59 (compare FIG. 7) is led to the control chamber 61, in which, furthermore, there is received a plate-type piston 89 fixedly connected to the engagement element 83. Furthermore, a ventilation connector 91 is provided at the control chamber 61.

In the housing 53 of the safety device 33, at an engagement end side, there is furthermore retained a pressure spring 63, specifically arranged in a spring space 69 which is formed between the control chamber 61 and the open end of the housing 53, wherein the pressure spring 63 is retained between a collar 93 of the engagement element engagement end 85 and a control-chamber-side end of the spring space 69. By means of the pressure spring 63, the engagement element 83 is, in the absence of an actuation, forced into the rest position shown in FIGS. 6 and 7 (here, it is for example the case that the engagement element engagement end 85 and/or for example the plate-type piston 89 make(s) contact with a stop).

At the engagement element engagement end 85—in order to ensure relative displaceability of the engagement ends 85, 87 of engagement element 83 and control piston 25 in the normal operating situation—there is furthermore formed a chamber or cutout 95 into which the control piston engagement end 87 is displaceable with control of the control piston 25. Here, in the chamber 95, there is received a spring 97 (which is weaker in relation to the spring 69) which ensures that, in the event of failure of the regulating device 7, the enlarged cross section (external collar) 99 of the control piston engagement end 87 is reliably forced against the driver portion 101 (internal collar) of the engagement element engagement end 85, whereby driving of the control piston 25 upon actuation of the safety device 33 is made reliably possible.

(Annular) seals 103 furthermore ensure media leak-tightness at the housings 53, the guide of the engagement element 83 and at the plate-type piston 89. A setting element (nut) 105 in the control chamber 61, arranged around the engagement element 83, furthermore permits setting of an intended residual delivery rate, specifically by definition of a predetermined position of the control piston 25 in the actuated state of the safety device 33 by means of the setting element 105.

With the arrangement as per FIGS. 6 and 7, functionality of the safety device 33 as discussed below is made possible.

In the normal operating situation of the regulating device 7, the control piston 25 is displaceable within the scope of the free space (at the engagement element engagement end 85) afforded by means of the cutout 95. During the course of this control, the different effective cross sections of the control piston 25 can be controlled in an intended manner in the fuel channel 29. If the regulating device 33 now fails, the control piston 25 is—upon actuation of the safety device 33—driven (via the driver or coupling mechanism composed of control piston collar 99 and engagement element collar 101) in the direction of the control chamber 61 by means of pressure medium introduced into the control chamber 61 (via connector 59) and the engagement element 83 that is hereby displaced in the direction from the control block 27 to the housing 53, or away from the control piston 25.

By means of the driver functionality of the engagement ends 85, 87, the control piston 25 is in this case subjected to pulling loading in the direction of the control chamber 61, whereby, into the fuel channel 29, there is displaced (shifted or pulled) a cross section of the control piston 25 which is suitable for intentionally reducing a presently excessively large through-flowable cross section (not illustrated). The displacement travel of the control piston 25, which in this case thus acts as shut-off member 51 of the safety device 33, is in this case predefined by the setting element 105, which, upon media pressurization of the control chamber 61, makes contact with a chamber base or a stop element (here, the chamber base may be formed by a housing cover). Here, by means of the setting of the displacement travel, a through-flowable cross section in the fuel channel 29 is thus set or predefined, which acts as a reduced through-flowable cross section upon actuation of the safety device 33.

In the case of the safety device as per FIGS. 6 and 7, which thus implements an actuating mechanism in the form of a pulling(-out) mechanism for an exertion of a pulling action—effected upon actuation—on the control piston 25 (with self-resetting capability after withdrawal of the actuation), the safety device 33 advantageously does not need to provide a dedicated shut-off member.

LIST OF REFERENCE DESIGNATIONS

1 Fuel injection system
3 Arrangement
5 High-pressure pump
7 Regulating device
7a Line
9 Fuel tank
11 Predelivery pump
13 Rail
15 Fuel injector
17 Pressure regulating valve
19 Discharge line
21 Pressure sensor
21a Line
23 Control unit
25 Control piston
27 Control block
29 Fuel channel
31 Low-pressure inlet (control block)
32 Low-pressure outlet (control block)
33 Safety device
37 Actuating device
39 Device for media pressurization
41 Pressurized media source
43 Valve
45 Line
47 Leakage outlet
49 Low-pressure inlet (high-pressure pump)
51 Shut-off member
53 Housing (safety device)
55 Receptacle
57 Drilled channel
59 Media connector
61 Control chamber
63 Spring element
65 Collar
67 Base
69 Spring space
71 End portion
73 Housing (high-pressure pump)
75 Installation space
77 Throttle arrangement
79 Regulating magnet part
81 Control connector
83 Engagement element
85 Engagement end (engagement element)
87 Engagement end (control piston)
89 (Plate-type) piston
91 Ventilation connector
93 Collar
95 Cutout
97 Spring
99 (External) collar
101 Driver portion (internal collar)
103 Seal
105 Setting element

The invention claimed is:

1. An apparatus comprising:
a fuel channel defined between an inflow side of a regulating device and a high pressure pump, the high pressure pump having a pump element;
the regulating device actuatable to vary a through-flowable cross section of the fuel channel;
a safety device, actuatable to reduce the through-flowable cross section of the fuel channel; and
a throttle assembly configured to be displaceable into the fuel channel upon actuation of the safety device, and the throttle assembly is further configured to maintain the through-flowable cross section of the fuel channel when displaced into the fuel channel.

2. The apparatus of claim 1, wherein the safety device is configured to be actuated to set (1) a defined through-flowable cross section at the fuel channel, (2) a defined residual delivery rate of the high-pressure pump, or (3) both.

3. The apparatus of claim 2, wherein the safety device is configured to, upon an actuation, displace an engagement element, whereby an action on a shut-off member for reducing a present through-flowable cross section of the fuel channel occurs.

4. The apparatus of claim 2, wherein the safety device is configured not to influence the through-flowable cross section of the fuel channel in the absence of an actuation.

5. The apparatus of claim 1, wherein the safety device is configured to be actuated to reduce a present through-flowable cross section of the fuel channel by action on a shut-off member.

6. The apparatus of claim 5, wherein the shut-off member is actuatable to be displaced relative to the fuel channel.

7. The apparatus of claim 5, wherein the safety device is configured for an auxiliary media actuation, and the shut-off member is configured to actuate based on the auxiliary media actuation.

8. The apparatus of claim 5, wherein the shut-off member is a piston of the safety device or a control piston of the regulating device.

9. The apparatus of claim 1, wherein the safety device is an independent safety device, configured to actuate independently of at least one of the regulating device and the high-pressure pump.

10. The apparatus of claim 1, wherein the safety device is configured to not shut off, partially shut off, or completely shut off the fuel channel, based on an actuation characteristic.

11. The apparatus of claim 10, wherein a displacement of a shut-off member is controllable to set a predetermined residual delivery rate of the high-pressure pump.

12. The apparatus of claim 1, wherein the safety device is formed on a control block of the regulating device of the high-pressure pump, or the safety device is formed on the high-pressure pump.

13. The apparatus of claim 1, wherein the regulating device is a suction-throttle-type regulating device, a pressure regulating valve device, or both.

14. The apparatus of claim 1, further comprising an actuating device configured to actuate the safety device in an event of failure of the regulating device.

15. A fuel injection system comprising:
- a high-pressure pump having a pump element;
- a fuel channel defined between an inflow side of a regulating device and the pump element;
- a regulating device, actuatable to vary a through-flowable cross section of the fuel channel;
- a safety device, actuatable to reduce the through-flowable cross section of the fuel channel; and
- a throttle assembly configured to be displaceable into the fuel channel upon actuation of the safety device, and the throttle assembly is further configured to maintain the through-flowable cross section in the fuel channel when displaced into the fuel channel.

16. An internal combustion engine comprising:
- a high-pressure pump having a pump element;
- a fuel channel defined between an inflow side of a regulating device and the pump element;
- a regulating device, actuatable to vary a through-flowable cross section of the fuel channel;
- a safety device, actuatable to reduce the through-flowable cross section of the fuel channel; and
- a throttle assembly configured to be displaceable into the fuel channel upon actuation of the safety device, and the throttle assembly is further configured to maintain the through-flowable cross section of the fuel channel when displaced into the fuel channel.

\* \* \* \* \*

UNITED STATES PATENT AND TRADEMARK OFFICE
CERTIFICATE OF CORRECTION

PATENT NO. : 11,236,717 B2
APPLICATION NO. : 16/966712
DATED : February 1, 2022
INVENTOR(S) : Grassler et al.

Page 1 of 1

It is certified that error appears in the above-identified patent and that said Letters Patent is hereby corrected as shown below:

On the Title Page

Item (12), Line 2, delete "Grassier" and insert -- Grassler --;

Item (72) (Inventors), Line 1, delete "Grassier" and insert -- Grassler --.

Signed and Sealed this
Nineteenth Day of July, 2022

Katherine Kelly Vidal
*Director of the United States Patent and Trademark Office*